(12) United States Patent
Chhabria et al.

(10) Patent No.: US 12,271,939 B2
(45) Date of Patent: Apr. 8, 2025

(54) AUTOMATION ENGINE USING A HYPERPARAMETER LEARNING MODEL TO OPTIMIZE SUB-SYSTEMS OF AN ONLINE SYSTEM

(71) Applicant: Maplebear Inc., San Francisco, CA (US)

(72) Inventors: Sonali Deepak Chhabria, San Carlos, CA (US); Xiangyu Wang, San Jose, CA (US); Aman Jain, Toronto (CA); Ganesh Krishnan, San Francisco, CA (US); Trace Levinson, San Francisco, CA (US); Jian Wang, Saratoga, CA (US)

(73) Assignee: Maplebear Inc., San Francisco, CA (US)

( * ) Notice: Subject to any disclaimer, the term of this patent is extended or adjusted under 35 U.S.C. 154(b) by 323 days.

(21) Appl. No.: 17/855,788

(22) Filed: Jun. 30, 2022

(65) Prior Publication Data

US 2024/0005381 A1 Jan. 4, 2024

(51) Int. Cl.
*G06Q 30/0601* (2023.01)
*G01C 21/34* (2006.01)
(Continued)

(52) U.S. Cl.
CPC ..... *G06Q 30/0635* (2013.01); *G01C 21/3407* (2013.01); *G06Q 10/06311* (2013.01); *G06Q 10/06375* (2013.01); *G06Q 10/087* (2013.01)

(58) Field of Classification Search
CPC ........... G01C 1/00–25/00; G06Q 10/00–50/00
(Continued)

(56) References Cited

U.S. PATENT DOCUMENTS 10,467,563 B1 * 11/2019 Mo ......................... G06F 16/29
2018/0189859 A1 * 7/2018 Campos .............. H04L 63/0815
(Continued)

FOREIGN PATENT DOCUMENTS

WO WO-2021016989 A1 * 2/2021
WO WO-2022023386 A1 * 2/2022 .............. B25J 9/161

OTHER PUBLICATIONS

PCT International Search Report and Written Opinion, PCT Application No. PCT/US22/49825, Feb. 24, 2023, 9 pages.

*Primary Examiner* — Alan S Miller
(74) *Attorney, Agent, or Firm* — Fenwick & West LLP

(57) ABSTRACT

An online concierge system includes a marketplace automation engine for setting various control parameters affecting marketplace operation. The marketplace automation engine applies a hyperparameter learning model to the marketplace state data to predict a set of hyperparameters affecting a set of respective parameterized control decision models. The hyperparameter learning model is trained on historical marketplace state data and a configured outcome objective for the online concierge system. The marketplace automation engine independently applies the set of parameterized control decision models to the marketplace state data using the hyperparameters to generate a respective set of control parameters affecting marketplace operation of the online concierge system. The marketplace automation engine applies the respective set of control parameters to operation of the online concierge system.

17 Claims, 8 Drawing Sheets

(51) Int. Cl.
 *G06Q 10/0631* (2023.01)
 *G06Q 10/0637* (2023.01)
 *G06Q 10/087* (2023.01)

(58) Field of Classification Search
 USPC .............................................. 705/7.11–7.42
 See application file for complete search history.

(56) References Cited

U.S. PATENT DOCUMENTS

| | | | |
|---|---|---|---|
| 2020/0082314 A1* | 3/2020 | Crapis | G06Q 10/06311 |
| 2020/0134557 A1* | 4/2020 | Pevzner | G06Q 10/0834 |
| 2020/0219171 A1* | 7/2020 | Zhuang | G06Q 30/0635 |
| 2020/0258098 A1* | 8/2020 | Graciani | G06N 20/20 |
| 2021/0142274 A1* | 5/2021 | Berk | G06Q 50/12 |
| 2021/0158384 A1* | 5/2021 | Mimassi | G06Q 10/02 |
| 2021/0269244 A1* | 9/2021 | Ahmann | B65G 1/0492 |
| 2023/0256593 A1* | 8/2023 | Zolna | B25J 9/163 |
| | | | 706/21 |
| 2023/0351477 A1* | 11/2023 | Cornacchia | G06Q 30/0641 |

* cited by examiner

AUTOMATION ENGINE USING A HYPERPARAMETER LEARNING MODEL TO OPTIMIZE SUB-SYSTEMS OF AN ONLINE SYSTEM

BACKGROUND

This disclosure relates generally to an online concierge system and more specifically to a marketplace automation engine for coordinating between independent sub-systems that control various marketplace parameters associated with an online concierge system.

In an online concierge system, a computing environment facilitates a process through which shoppers fulfill and deliver orders for customers at a physical retailer. The online concierge system creates a complex marketplace with many factors affecting the efficiency of operation. For example, the marketplace is affected by the number of orders being requested, the cost to the customers, the estimated and actual arrival times, the availability of shoppers, compensation or other benefits provided to shoppers, the assignment of shoppers to orders, the availability of items at the retailers, the incentives provided to retailers for participation, and numerous other factors. While the online concierge system can configure various parameters that affect the marketplace and encourage a certain outcome, the control parameters often have complex interdependencies that result in a challenging optimization problem.

SUMMARY

An online concierge system facilitates processing of requests, via a customer application, for procurement of one or more items from one or more warehouses, assignment of requests to available shoppers via a shopper application, and generation of routing instructions for delivery of the one or more items by the shoppers to the respective customers. The online concierge system includes a marketplace automation engine for configuring various control parameters affecting marketplace operation in a coordinated manner, according to a configurable outcome objective. The marketplace automation engine obtains marketplace state data associated with the online concierge system. The marketplace automation engine applies a hyperparameter learning model to the marketplace state data to predict a set of hyperparameters affecting a set of respective parameterized control decision models. The hyperparameter learning model is trained on historical marketplace state data and a configured outcome objective for the online concierge system. The marketplace automation engine independently applies a set of parameterized control decision models to the marketplace state data using the hyperparameters to generate a respective set of control parameters affecting marketplace operation of the online concierge system. The marketplace automation engine applies the respective set of control parameters to control operation of the online concierge system.

In an embodiment, the marketplace automation engine furthermore logs the marketplace state data over a period of time and re-trains the hyperparameter learning model based on the stored marketplace state data.

In an embodiment, re-training the hyperparameter learning model comprises obtaining, from the marketplace state data, a set of marketplace inputs associated with the period of time, obtaining, from the marketplace state data, a set of marketplace outcomes associated with the period of time, deriving an outcome objective value from the set of marketplace outcomes, applying an optimizer to determine a set of optimal hyperparameters that optimize the outcome objective under the set of marketplace inputs, and training the hyperparameter learning model to learn relationships between the marketplace state data for the period of time and the set of optimal hyperparameters for the marketplace state data.

In an embodiment, deriving the outcome objective comprises computing a real-time outcome objective associated with the set of marketplace outcomes.

In another embodiment, deriving the outcome objective comprises simulating operation of the marketplace to compute a delayed outcome objective associated with the set of marketplace outcomes.

In an embodiment, applying the optimizer comprises computing respective outcome objective values over varying combinations of hyperparameters, and identifying the set of optimal hyperparameters based on an optimal outcome objective value of the respective outcome objective values.

In an embodiment, training the hyperparameter learning model comprises applying an offline reinforcement learning algorithm.

In an embodiment, the different control parameters include at least one of an estimated-time-of-arrival (ETA) associated with a proposed delivery request for a customer of the online concierge system, a surge pricing level for setting a surge fee associated with a proposed delivery request using the online concierge system, a shopper promotion level for setting a shopper promotion amount to encourage additional shoppers to become available for requests in the online concierge system, and a batching decision parameter for assigning multiple requests from different customers to a single shopper in the online concierge system.

In an embodiment, applying the set of parameterized control decision models comprises applying for each of the control parameters, a machine learning model trained to learn relationships between a corresponding control parameter and a local objective associated with the corresponding control parameter under the set of hyperparameters.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Architecture

Figure 1:
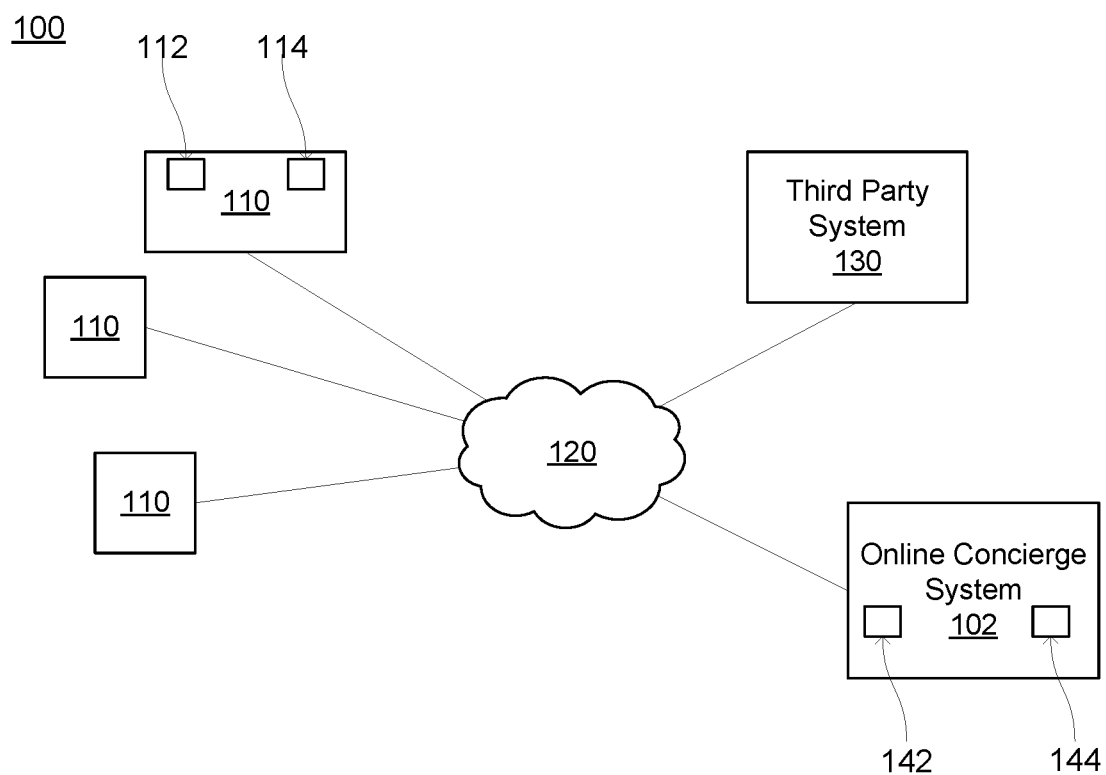
FIG. 1 is a block diagram of a system environment in which an online system, such an online concierge system, operates, according to one or more embodiments.

FIG. 1 is a block diagram of a system environment 100 in which an online system operates, such as an online concierge system 102 as further described below in conjunction with FIGS. 2 and 3. The system environment 100 shown by FIG. 1 comprises one or more client devices 110, a network 120, one or more third-party systems 130, and the online concierge system 102. In alternative configurations, different and/or additional components may be included in the system environment 100.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a shopper mobile application 212, as further described below in conjunction with FIGS. 8A and 8B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 8A and 8B, respectively.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further described below that, when executed by the processor 142, cause the processor to perform the functionality further described herein. For example, the memory 144 has instructions encoded thereon that, when executed by the processor 142, cause the processor 142 to facilitate operation of the online concierge system 102 in accordance with a marketplace automation engine that controls various parameters affecting marketplace operation in a coordinated way. Additionally, the online concierge system 102 includes a communication interface configured to connect the online concierge system 102 to one or more networks, such as network 120, or to otherwise communicate with devices (e.g., client devices 110) connected to the one or more networks.

One or more of a client device 110, a third party system 130, or the online concierge system 102 may be special purpose computing devices configured to perform specific functions, as further described below in conjunction with FIGS. 2-8A/B, and may include specific computing components such as processors, memories, communication interfaces, and/or the like.

System Overview

Figure 2:
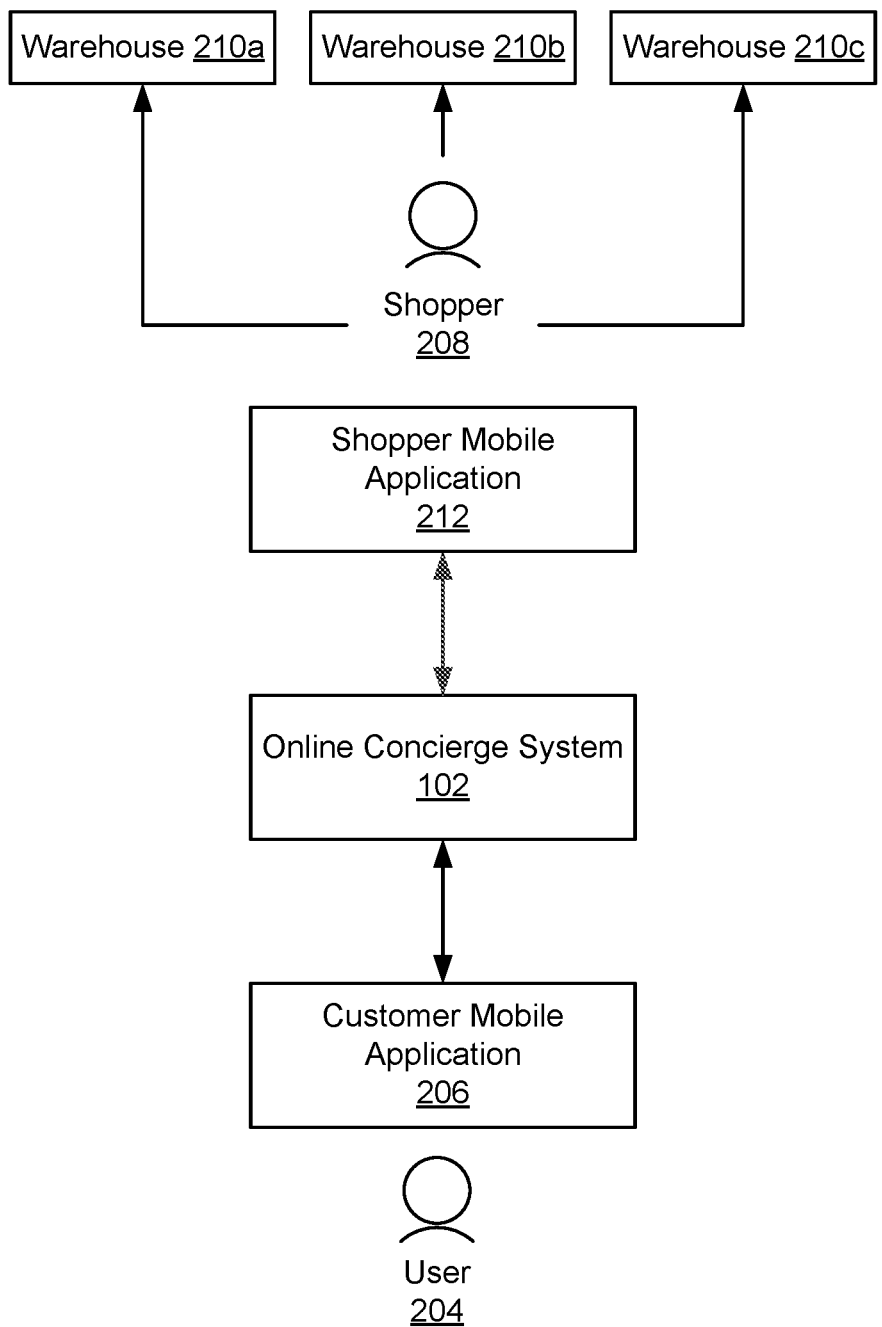
FIG. 2 illustrates an environment of an online shopping concierge service, according to one or more embodiments.

FIG. 2 illustrates an environment 200 of an online platform, such as an online concierge system 102, according to one or more embodiments. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one user 204 is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 102. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one embodiment, shoppers 208 make use of a shopper mobile application 212 which is configured to interact with the online concierge system 102.

Figure 3:
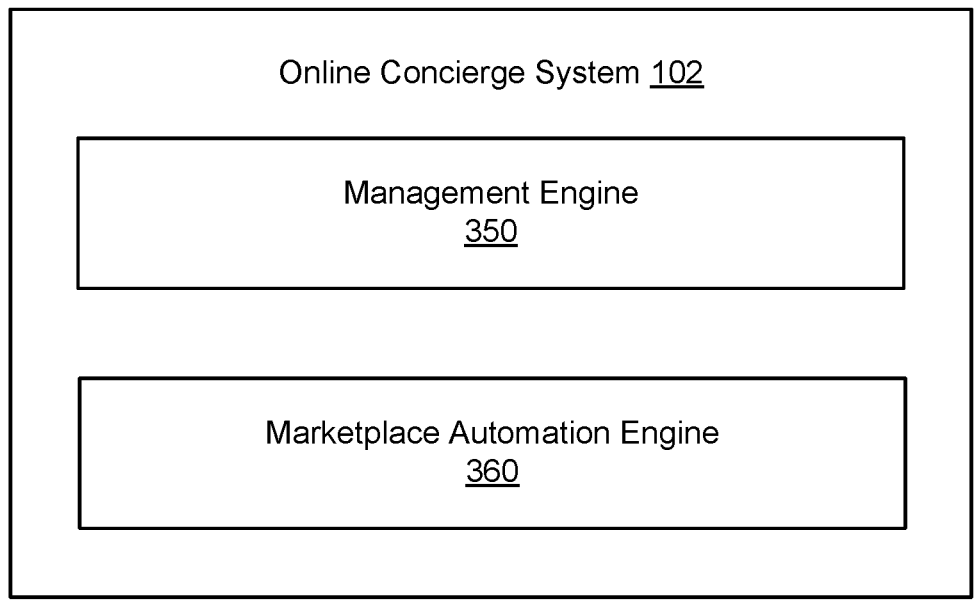
FIG. 3 is a diagram of an online shopping concierge system, according to one or more embodiments.

FIG. 3 is a diagram of an online concierge system 102, according to one or more embodiments. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes a management engine 350 and a marketplace automation engine 360. The management engine 350 controls various management functions of the online concierge system 102 such as managing participating users 204, warehouses 210, and shoppers 208, tracking inventory and pricing, maintaining transaction records, and managing order fulfillment. An example embodiment of a management engine 350 is described in further detail below with respect to FIGS. 8A-B. The marketplace automation engine 360 controls various operational parameters that affect that overall marketplace by incentivizing or disincentivizing participation from users 204, shoppers 208, and warehouses 210, controlling pricing parameters, estimating arrival times, or other operational parameters that may affect high-level performance of the online concierge system 102. The marketplace automation engine 360 may operate to optimize certain high-level business objectives such as profitability, conversion rate, late arrival rate (of deliveries), or other objectives. An example embodiment of a marketplace automation engine 360 is described in further detail below with respect to FIG. 4.

Marketplace Automation Engine

Figure 4:
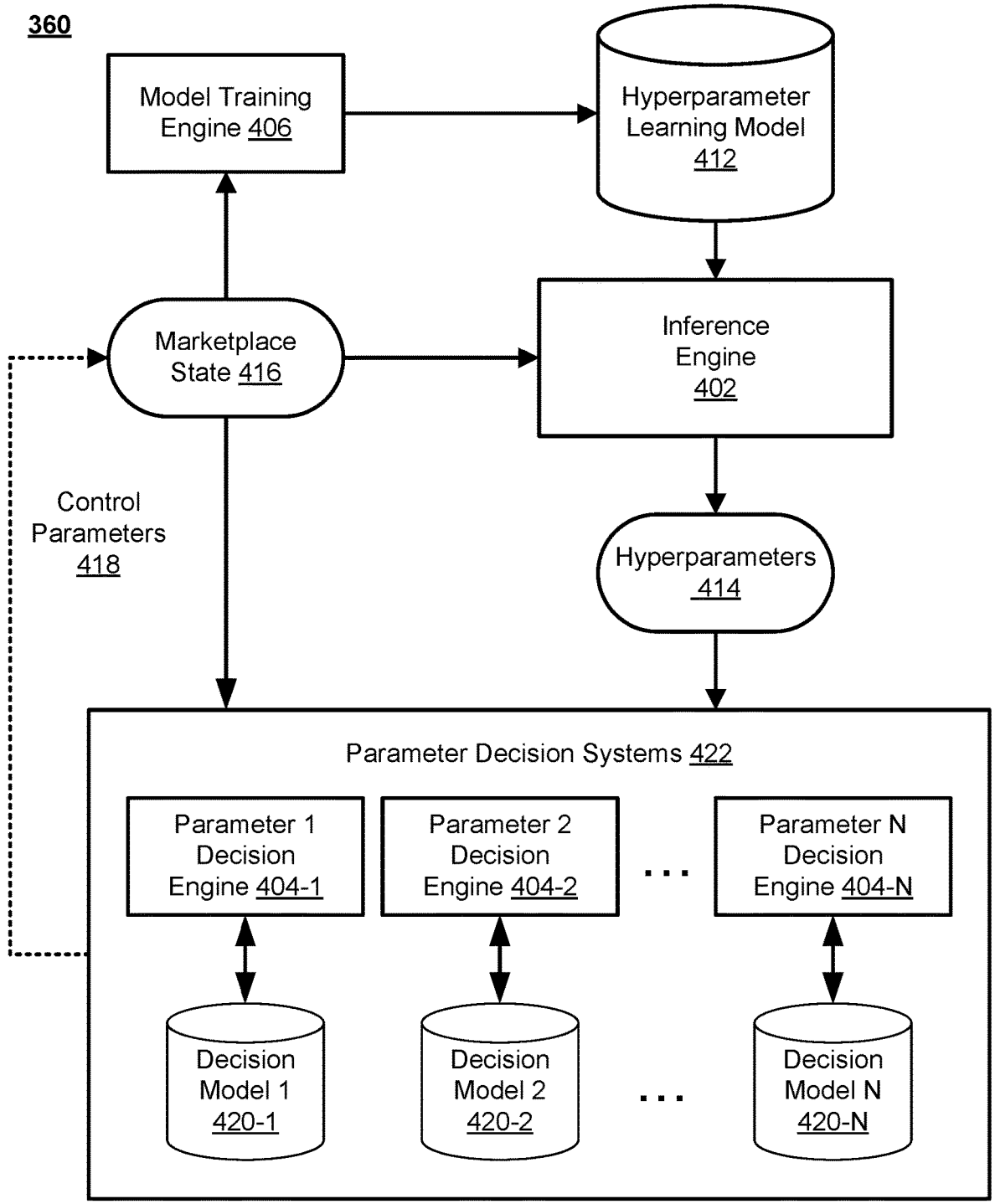
FIG. 4 is a diagram illustrating a marketplace automation engine, according to one or more embodiments.

FIG. 4 is an example embodiment of a marketplace automation engine 360. The marketplace automation engine 360 includes an inference engine 402, a model training engine 406, and a parameter decision sub-system 422 including a set of parameter decision engines 404 (e.g., parameter decision engines 404-1, 404-2, . . . , 404-N) and a set of parameter decision models 420 (e.g., parameter decision models 420-1, 420-2, . . . , 420-N). Alternative embodiments of the marketplace automation engine 360 may comprise different or additional modules.

The set of parameter decision engines 404 are each associated with a different control parameter 418 that affects marketplace operation. For example, the control parameters 418 may directly affect or indirectly influence participation of customers, shoppers, and/or warehouses in the online concierge system 102, may affect efficiency of order fulfillment, and/or may affect various high-level business objectives such as profitability, conversion rate, late arrival rate, etc. Examples of control parameters may include estimated times of arrival (ETAs) provided to a user 204 in association with a prospective or pending order, a level of surge pricing or discount pricing to be charged to users 204 in association with a prospective order, an availability schedule specifying fulfillment time windows for advance orders, shopper promotion levels indicating promotional benefits awarded to shoppers, batching decision parameters controlling assignment of orders from multiple users 204 to a shopper 208, matching decision parameters controlling how orders are matched to shoppers 208, item pricing parameters controlling pricing of individual items, or other control parameters that may affect marketplace operation. The marketplace automation engine 360 configures the various control parameters 418 in a coordinated way to achieve one or more marketplace objectives such as, for example, maximizing conversions, maximizing profit or revenue, minimizing late deliveries (i.e., arrivals after the ETA), or a combination thereof.

Each parameter decision engine 404 may independently set one of the respective control parameters 418 based on an independent parameter decision model 420 specific to the control parameter 418 generated by the corresponding parameter decision engine 404, the current marketplace state 408, and a set of hyperparameters 410 that are applied globally. Here, the marketplace state 416 represents a set of observable (or predictable) state variables collectively describing the marketplace. The marketplace state 416 may be characterized, for example, by measures of supply and demand (e.g., number of orders, number of active users 204, number of participating shoppers 208, etc.), various performance measurements (e.g., number of orders in a given time period, conversion rate indicative of a number of users that place an order within a given time period, late percentage indicative of a number of orders that arrive after the ETA, user satisfaction metrics, shopper satisfaction metrics, etc.), various financial metrics (e.g., revenue, profit, expenses, etc.), a current configuration of current control parameter settings, external factors (e.g., time of day, day of week, time of year, etc., weather, etc.), or other variables characterizing a marketplace. A marketplace state 416 may be localized to a specific time window (e.g., last few hours, last few days, last month) and/or to a specific geographic region.

In an embodiment, each parameter decision engine 404 applies an optimization function that optimizes a weighted combination of parameterized sub-functions in which the hyperparameters 414 specify the weights. For example, a parameter decision model 420 for determining a target delivery time (ETA) may set the ETA based on a function specified as:

$$ETA = \max\{a * pCVR(eta) - b * pCost(eta) - c * pLate(eta)\}$$

where the sub-functions pCVR(eta) represents a predicted conversion likelihood associated with a candidate ETA, pCost(eta) represents a cost associated with achieving the ETA, and pLate(eta) represents a predicted likelihood of an order an order arriving late associated with the candidate ETA. The max operator is a function that finds the candidate ETA resulting in the maximum combination, where the sub-functions are each weighted by the hyperparameters a, b, c respectively.

The parameterized sub-functions (e.g., pCVR(eta), pCost (eta), pLate (eta)) may be computed based on respective machine learning models trained based on historical or simulated marketplace state data associated with the online concierge system 102. For example, a machine learning model associated with the pCVR(eta) sub-function may be trained to predict the conversion likelihood for given marketplace state data 416 and a specified ETA. Machine learning models may be similarly trained to predict cost, lateness, or other outcomes represented by the various sub-functions. Various types of models may be used for implementing each sub-function such as, for example, reinforcement learning models, regression models, multi-arm bandit models, or other types of machine learning models. In further embodiments, the parameterized sub-functions may be directly computed without necessarily using machine learning based on, for example, linear or nonlinear combination functions.

While the above examples are exemplary, each parameter decision model 420 may be based on a different set of parameterized sub-functions. Some of the sub-functions may be shared between different parameter decision engines 404 while other sub-functions may be unique. Furthermore, different hyperparameters (weights) may be associated with the sub-functions in the different parameter decision models 420.

The outputs of the parameter decision engines 404 are respective individual control parameters 418 that are applied by the online concierge system 102 and may directly or indirectly affect a future marketplace state 416 together with external marketplace factors (as indicated by the dashed line).

The inference engine 402 generates the hyperparameters 414 (e.g., a, b, and c in the example above) based on the marketplace state 416 and a hyperparameter learning model 412. The inference engine 402 and hyperparameter learning model 412 operate to predict the hyperparameters 414 to apply for the current marketplace state 416 that optimizes an objective function built into the model 412. The objective function may be designed to predict hyperparameters 414 based on a high-level business objective (or combination thereof) such as profit, conversion rate, frequency of late deliveries, or other marketplace performance metrics.

The model training engine 406 trains the hyperparameter learning model 412 according to one or more machine learning algorithms. The model training engine 406 may train the hyperparameter learning model 412 based on reinforcement learning techniques, multi-arm bandit techniques, regression techniques, or other machine learning techniques. In an embodiment, the model training engine 406 operates in an offline manner. Here, the model training engine 406 accumulates marketplace state data 416 over a period of time and then retrains the hyperparameter learning model 412 after the period is complete using the accumulated marketplace state data 416. In this way, the model training engine 406 may include outcomes in the learning process that may be delayed relative to changes in inputs. An example embodiment of a model training engine 406 is described in further detail below with respect to FIG. 5.

The described marketplace automation engine 360 may include individual parameter decision engines 404 that operate agnostically to the outputs of other parameter decision engines 404. In other words, the operation of one parameter decision engine 404 to compute a control parameter 418 under a given marketplace state 416 does not directly depend on the output of another parameter decision engine 404. The marketplace automation engine 322 is therefore highly scalable and enables parameter decision engines 404 for different parameter decision engines 404 for different control parameters 418 to be added, removed, or modified without affecting operation of other parameter decision engines 404 or other system components. Moreover, the parameter decision engines 404 may perform computations in parallel with each other without one engine 404 requiring an output from a different engine 404 to perform its decision.

While each parameter decision engine 404 is designed to operate independently, the parameter decision engines 404 nevertheless operate to collectively generate a set of coordinated control parameters 418 that operate together to achieve a particular marketplace objective. This coordination is achieved, in part, because the parameter decision engines 404 are each parameterized using a coordinated set of sub-functions and a common set of hyperparameters 414 that are trained based on the overall objective function.

In an example scenario illustrative of the coordination between parameter decision engines 404, changes to different individual control parameters 418 could achieve similar effects on the objective function. For example, both extending ETA and decreasing shopper promotions may operate to decrease demand. If left to run independently, the respective optimization engines 404 may each adjust their respective control parameters 418 to decrease demand, but the combined effect may overcompensate or lead to other undesirable results. In contrast, under the described marketplace automation engine 360, the hyperparameters 414 function to provide coordination between different control parameters 418 based on the predicted combined effect. For example, under the above example scenario, hyperparameters 414 may be set to extend ETA without decreasing shopper promotions so as to achieve a decrease in demand without overcompensation. In practice, coordination between parameter decision engines 404 may be more complex. For example, rather than operating in a binary manner to turn on or off different parameter decision engine 404, the hyperparameters 414 may operate to fine tune each of the different control parameters 418 such that their contributions have the intended combined effect on the marketplace state 416.

Figure 5:
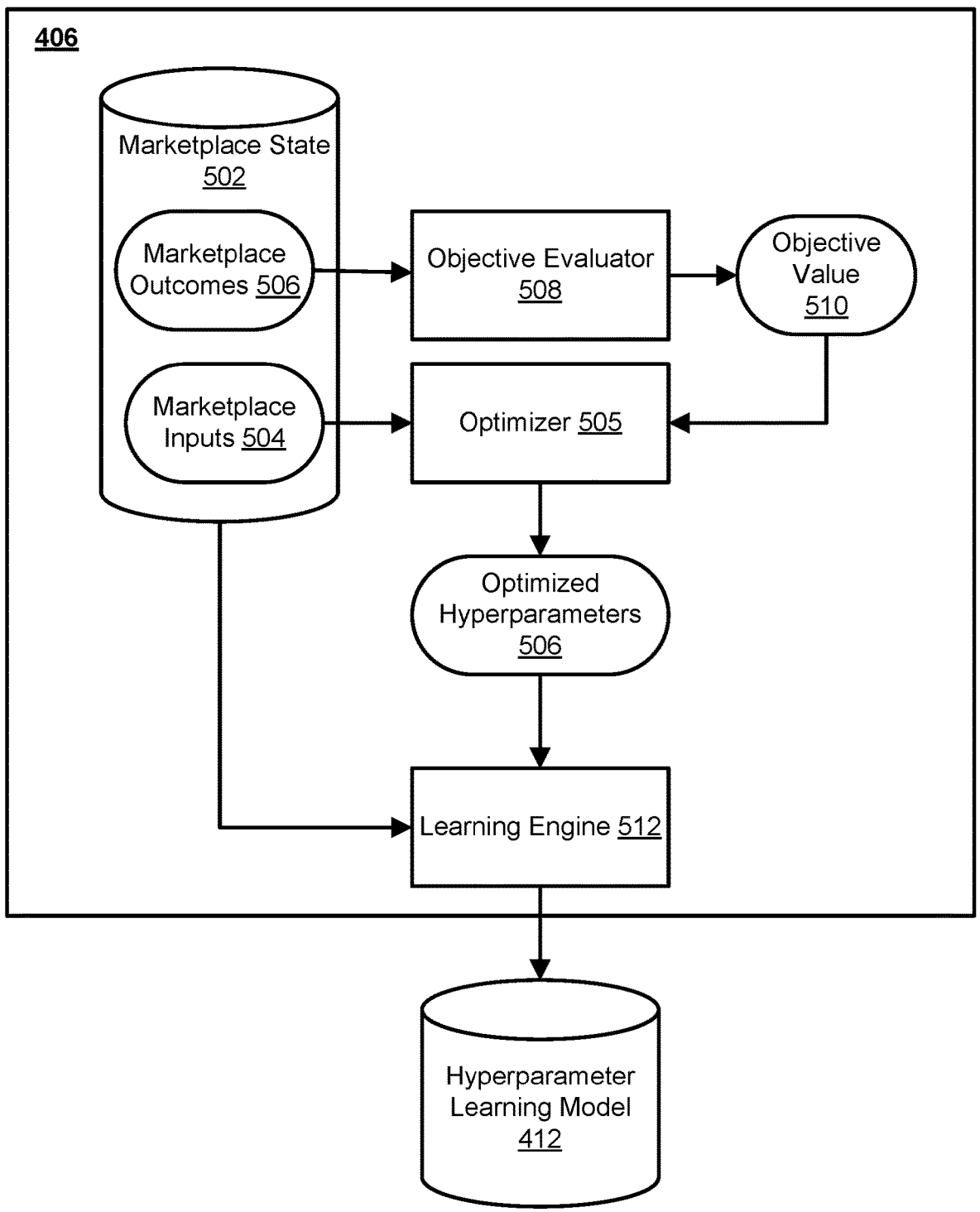
FIG. 5 is a diagram illustrating a model training engine, according to one or more embodiments.

FIG. 5 is an example embodiment of a model training engine 406 associated with a marketplace automation engine 360. The model training engine 406 includes an objective evaluator 508, an optimizer 505, and a marketplace state data store 502. The marketplace state data store 502 stores historical marketplace state data accumulated over a time period (e.g., hours, days, weeks, months, or years) and/or simulated marketplace state data derived from a simulation of the marketplace. The marketplace state data 502 may include marketplace inputs 504 representing various factors that control operation of the marketplace and marketplace outcomes 506 representing various observable characteristics of the marketplace. Examples of marketplace inputs 504 may include real-time supply indicators, real-time demand indicators, throughput, trailing lates, trailing cost, and trailing conversion. Examples of marketplace outcomes 506 may include conversion rate, cost, and late percentage.

The objective evaluator 508 generates an objective value 510 from the set of marketplace outputs 506. In an embodiment, the objective evaluator 508 applies a function related to evaluating high-level business metrics such as overall profits, on-time deliveries, marketplace participation, etc. In an embodiment, the function computes a weighted combination of the marketplace outputs 506 to generate a real-time objective value 510 associated with corresponding marketplace outcomes 506. Alternatively, the objective evaluator 508 may apply a machine learning model that predicts an objective value 510 based on the marketplace outputs 506. Here, the machine learning model applied by the objective evaluator 508 may be trained on historical or simulated marketplace data to predict a relationship between observable real-time state data and corresponding real-time observed objective values. In other embodiments, the objective value 510 may include outcomes that are delayed relative to the marketplace state 502, i.e., the outcome(s) associated with a given set of inputs are not necessarily observable in real-time. In this case, the objective evaluator 508 may include a simulator to simulate the marketplace state 502 over time and predict a future objective value 510 associated with a current marketplace state 502. The simulator may comprise, for example, a stochastic model that predicts for each of a series of time steps, actions taken by the parameter decision engines 404 under a current state, and an effect of those actions on a subsequent marketplace state.

The optimizer 505 obtains the marketplace inputs 504 associated with a given time period and the derived objective values 510 associated with the corresponding time periods and determines a set of optimized hyperparameters 506 predicted to optimize the objective value 510 under the corresponding market state 502. In an embodiment, the optimizer 505 may operate by actively varying the hyperparameters 506 under a constant marketplace state 502 to determine which combination of hyperparameters 506 results in a maximized objective value 510. For example, for a small hyperparameter space, the optimizer 505 may observe the objective value 510 for each different combination of hyperparameters to determine the optimal combination that maximizes the objective value 510. In other embodiments, the optimizer 505 may apply a nonlinear optimization function to compute an optimal combination of hyperparameters. The optimal hyperparameters 506 may then be stored as labels associated with the corresponding marketplace state 502.

A learning engine 512 applies a machine learning algorithm to learn relationships between a marketplace state 502 and its corresponding optimized hyperparameters 506 and represent the learned relationships in the hyperparameter learning model 412. The learning engine 512 may train the hyperparameter learning model 412 based on reinforcement learning techniques, regression techniques, multi-arm bandit techniques, or other machine learning techniques.

Figure 6:
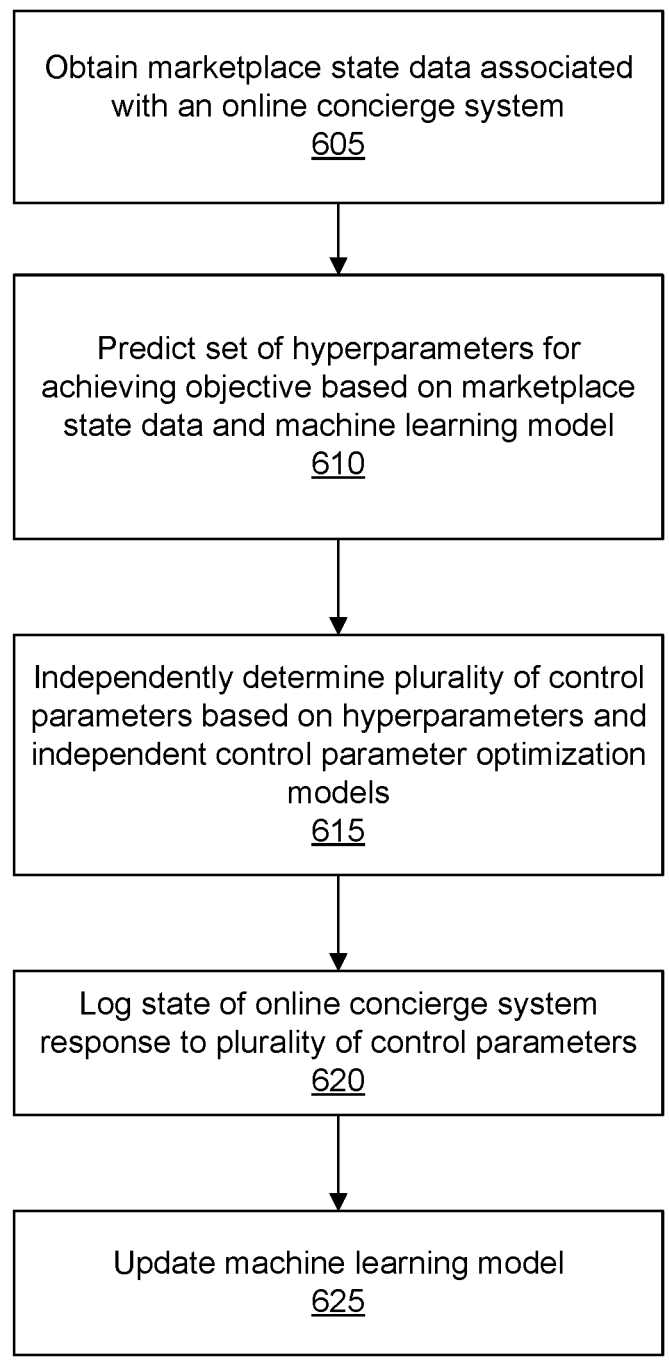
FIG. 6 is a flowchart illustrating a process for determining control decision parameters associated with an online concierge system, according to one or more embodiments.

FIG. 6 is a flowchart of one embodiment of a method for operating a marketplace automation engine 360. A marketplace automation engine 360 obtains 605 marketplace state data associated with operation of an online concierge system 102. The marketplace automation engine 360 predicts 610 a set of hyperparameters for achieving an objective based on the marketplace state data and a machine learning model (e.g., the above-described hyperparameter learning model 412). The marketplace automation engine 360 independently determines 615 a plurality of control parameters based on the hyperparameters and respective independent control parameter decision models 420. The marketplace automation engine 360 logs 620 the state of the online concierge system 102 as it changes based on the updated control parameters, observed changes in marketplace input data, and observed outcomes relevant to the objective. The marketplace automation engine 360 may further update 625 the machine learning model (e.g., the hyperparameter learning model 412) based on the historical marketplace states. The updates may occur in an offline process that executes on an accumulated set of states observed over a time window.

In various embodiments, the method includes different or additional steps than those described in conjunction with FIG. 6. Further, in some embodiments, the steps of the method may be performed in different orders than the order described in conjunction with FIG. 6. The method described in conjunction with FIG. 6 may be carried out by the online concierge system 102 in various embodiments, while in other embodiments, the steps of the method are performed by any online system capable of performing the steps described herein.

Management Engine

Figure 7:
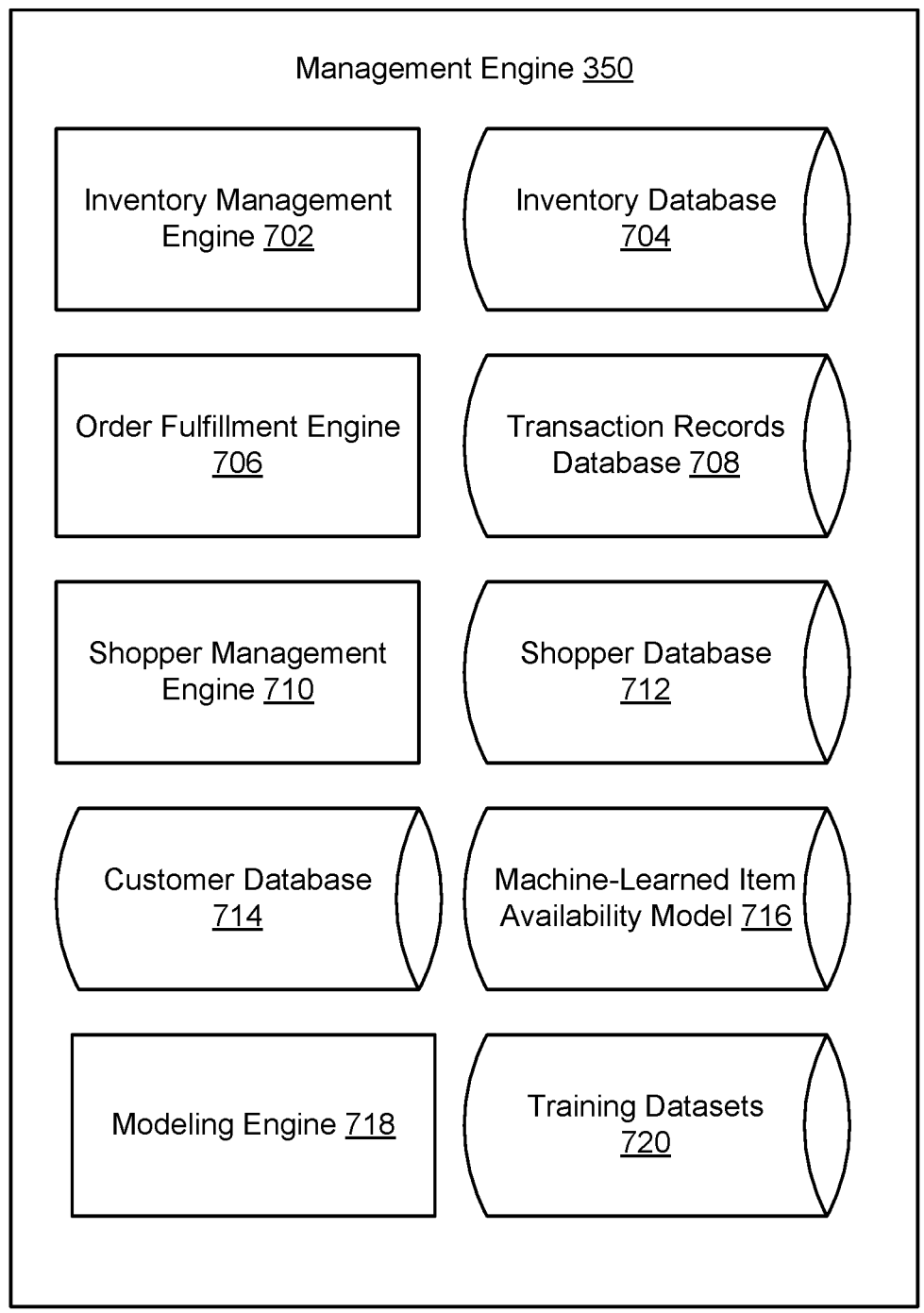
FIG. 7 is a diagram illustrating a management engine for an online concierge system, according to one or more embodiments.

As shown in FIG. 7, the management engine 350 includes an inventory management engine 302, which interacts with inventory systems associated with each warehouse 210. In one embodiment, the inventory management engine 702 requests and receives inventory information maintained by the warehouse 210. The inventory of each warehouse 210 is unique and may change over time. The inventory management engine 702 monitors changes in inventory for each participating warehouse 210. The inventory management engine 702 is also configured to store inventory records in an inventory database 704. The inventory database 704 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one embodiment, the inventory database 704 also stores purchasing rules associated with each item, if they exist. For example, age-restricted items such as alcohol and tobacco are flagged accordingly in the inventory database 704. Additional inventory information useful for predicting the availability of items may also be stored in the inventory database 704. For example, for each item-warehouse combination (a particular item at a particular warehouse), the inventory database 704 may store a time that the item was last found, a time that the item was last not found (a shopper looked for the item but could not find it), the rate at which the item is found, and the popularity of the item.

For each item, the inventory database 704 identifies one or more attributes of the item and corresponding values for each attribute of an item. For example, the inventory database 704 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 704 to maintain values of different categories for various items.

In various embodiments, the inventory management engine 702 maintains a taxonomy of items offered for purchase by one or more warehouses 210. For example, the inventory management engine 702 receives an item catalog from warehouse 210 identifying items offered for purchase by warehouse 210. From the item catalog, the inventory management engine determines a taxonomy of items offered by the warehouse 210 in which different levels in the taxonomy provide different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 210 in various embodiments. In other embodiments, the inventory management engine 702 applies a trained classification module to an item catalog received from a warehouse 210 to include different items in levels of the taxonomy, so application of the trained classification model associates specific items with categories corresponding to levels within the taxonomy.

Inventory information provided by the inventory management engine 702 may supplement the training datasets 720. Inventory information provided by the inventory management engine 702 may not necessarily include information about the outcome of picking a delivery order associated with the item, whereas the data within the training datasets 720 is structured to include an outcome of picking a delivery order (e.g., if the item in an order was picked or not picked).

The online concierge system 102 also includes an order fulfillment engine 706 which is configured to synthesize and display an ordering interface to each user 204 (for example, via the customer mobile application 206). The order fulfillment engine 706 is also configured to access the inventory database 704 in order to determine which products are available at which warehouse 210. The order fulfillment engine 706 may supplement the product availability information from the inventory database 234 with an item availability predicted by the machine-learned item availability model 716. The order fulfillment engine 706 determines a sale price for each item ordered by a user 204. Prices set by the order fulfillment engine 706 may or may not be identical to in-store prices determined by retailers (which is the price that users 204 and shoppers 208 would pay at the retail warehouses). The order fulfillment engine 706 also facilitates transactions associated with each order. In one embodiment, the order fulfillment engine 706 charges a payment instrument associated with a user 204 when he/she places an order. The order fulfillment engine 706 may transmit payment information to an external payment gateway or payment processor. The order fulfillment engine 706 stores payment and transactional information associated with each order in a transaction records database 708.

In various embodiments, the order fulfillment engine 706 generates and transmits a search interface to a client device of a user for display via the customer mobile application 206. The order fulfillment engine 706 receives a query comprising one or more terms from a user and retrieves items satisfying the query, such as items having descriptive information matching at least a portion of the query. In various embodiments, the order fulfillment engine 706 leverages item embeddings for items to retrieve items based on a received query. For example, the order fulfillment engine 706 generates an embedding for a query and determines measures of similarity between the embedding for the query and item embeddings for various items included in the inventory database 704.

In some embodiments, the order fulfillment engine 706 also shares order details with warehouses 210. For example, after successful fulfillment of an order, the order fulfillment engine 706 may transmit a summary of the order to the appropriate warehouses 210. The summary may indicate the items purchased, the total value of the items, and in some cases, an identity of the shopper 208 and user 204 associated with the transaction. In one embodiment, the order fulfillment engine 706 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 706, which provides detail of all orders which have been processed since the last request.

The order fulfillment engine 706 may interact with a shopper management engine 710, which manages communication with and utilization of shoppers 208. In one embodiment, the shopper management engine 710 receives a new order from the order fulfillment engine 706. The shopper management engine 710 identifies the appropriate warehouse 210 to fulfill the order based on one or more parameters, such as a probability of item availability determined by a machine-learned item availability model 716, the contents of the order, the inventory of the warehouses, and the proximity to the delivery location. The shopper management engine 710 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 710 accesses a shopper database 712 which stores information describing each shopper 208, such as his/her name, gender, rating, previous shopping history, and so on.

As part of fulfilling an order, the order fulfillment engine 706 and/or shopper management engine 710 may access a user database 714 which stores information describing each user. This information could include each user's name, address, gender, shopping preferences, favorite items, stored payment instruments, and so on.

In various embodiments, the order fulfillment engine 706 determines whether to delay display of a received order to shoppers for fulfillment by a time interval. In response to determining to delay the received order by a time interval, the order fulfillment engine 706 evaluates orders received after the received order and during the time interval for inclusion in one or more batches that also include the received order. After the time interval, the order fulfillment engine 706 displays the order to one or more shoppers via the shopper mobile application 212; if the order fulfillment engine 706 generated one or more batches including the received order and one or more orders received after the received order and during the time interval, the one or more batches are also displayed to one or more shoppers via the shopper mobile application 212.

Machine Learning Models for Item Availability

The online concierge system 102 further includes a machine-learned item availability model 716, a modeling engine 718, and training datasets 720. The modeling engine 718 uses the training datasets 720 to generate the machine-learned item availability model 716. The machine-learned item availability model 716 can learn from the training datasets 720, rather than follow only explicitly programmed instructions. The inventory management engine 702, order fulfillment engine 706, and/or shopper management engine 710 can use the machine-learned item availability model 716 to determine a probability that an item is available at a warehouse 210. The machine-learned item availability model 716 may be used to predict item availability for items being displayed to or selected by a user or included in received delivery orders. A single machine-learned item availability model 716 is used to predict the availability of any number of items.

The machine-learned item availability model 716 can be configured to receive as inputs information about an item, the warehouse for picking the item, and the time for picking the item. The machine-learned item availability model 716 may be adapted to receive any information that the modeling engine 718 identifies as indicators of item availability. At minimum, the machine-learned item availability model 716 receives information about an item-warehouse pair, such as an item in a delivery order and a warehouse at which the order could be fulfilled. Items stored in the inventory database 704 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 704. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 704 and/or warehouse database and provide this extracted information as inputs to the item availability model 716.

The machine-learned item availability model 716 contains a set of functions generated by the modeling engine 718 from the training datasets 720 that relate the item, warehouse, and timing information, and/or any other relevant inputs, to the probability that the item is available at a warehouse. Thus, for a given item-warehouse pair, the machine-learned item availability model 716 outputs a probability that the item is available at the warehouse. The machine-learned item availability model 716 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 716 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 716 may be updated and adapted following retraining with new training datasets 720. The machine-learned item availability model 716 may be any machine learning model, such as a neural network, boosted tree, gradient boosted tree or random forest model. In some examples, the machine-learned item availability model 716 is generated from XGBoost algorithm.

The item probability generated by the machine-learned item availability model 716 may be used to determine instructions delivered to the user 204 and/or shopper 208, as described in further detail below.

The training datasets 720 relate a variety of different factors to known item availabilities from the outcomes of previous delivery orders (e.g., if an item was previously found or previously unavailable). The training datasets 720 include the items included in previous delivery orders, whether the items in the previous delivery orders were picked, warehouses associated with the previous delivery orders, and a variety of characteristics associated with each of the items (which may be obtained from the inventory database). Each piece of data in the training datasets 720 includes the outcome of a previous delivery order (e.g., if the item was picked or not). The item characteristics may be determined by the machine-learned item availability model 716 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 716 may weight these factors differently, where the weights are a result of a "learning" or training process on the training datasets 720. The training datasets 720 are very large datasets taken across a wide cross section of warehouses, shoppers, items, warehouses, delivery orders, times, and item characteristics. The training datasets 720 are large enough to provide a mapping from an item in an order to a probability that the item is available at a warehouse. In addition to previous delivery orders, the training datasets 720 may be supplemented by inventory information provided by the inventory management engine 702. In some examples, the training datasets 720 are historic delivery order information used to train the machine-learned item availability model 716, whereas the inventory information stored in the inventory database 704 include factors input into the machine-learned item availability model 716 to determine an item availability for an item in a newly received delivery order. In some examples, the modeling engine 718 may evaluate the training datasets 720 to compare a single item's availability across multiple warehouses to determine if an item is chronically unavailable. This may indicate that an item is no longer manufactured. The modeling engine 718 may query a warehouse 210 through the inventory management engine 702 for updated item information on these identified items.

Machine Learning Factors for Item Availability

The training datasets 720 include a time associated with previous delivery orders. In some embodiments, the training datasets 720 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 720 include a day of the week previous delivery orders were placed. The day of the week may impact item availability since popular shopping days may have reduced inventory of items or restocking shipments may be received on particular days. In some embodiments, training datasets 720 include a time interval since an item was previously picked in a previous delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 720 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 720 may also include a rate at which an item is typically found by a shopper at a warehouse, a number of days since inventory information about the item was last received from the inventory management engine 702, a number of times an item was not found in a previous week, or any number of additional rate or time information. The relationships between this time information and item availability are determined by the modeling engine 718 training a machine learning model with the training datasets 720, producing the machine-learned item availability model 716.

The training datasets 720 include item characteristics. In some examples, the item characteristics include a department associated with the item. For example, if the item is yogurt, it is associated with the dairy department. The department may be the bakery, beverage, nonfood, meat, pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 702. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 718 training a machine learning model with the training datasets 720, producing the machine-learned item availability model 716.

The training datasets 720 may include additional item characteristics that affect the item availability and can therefore be used to build the machine-learned item availability model 716 relating the delivery order for an item to its predicted availability. The training datasets 720 may be periodically updated with recent previous delivery orders. The training datasets 720 may be updated with item availability information provided directly from shoppers 208. Following updating of the training datasets 720, a modeling engine 718 may retrain a model with the updated training datasets 720 and produce a new machine-learned item availability model 716.

Customer Mobile Application

Figure 8A:
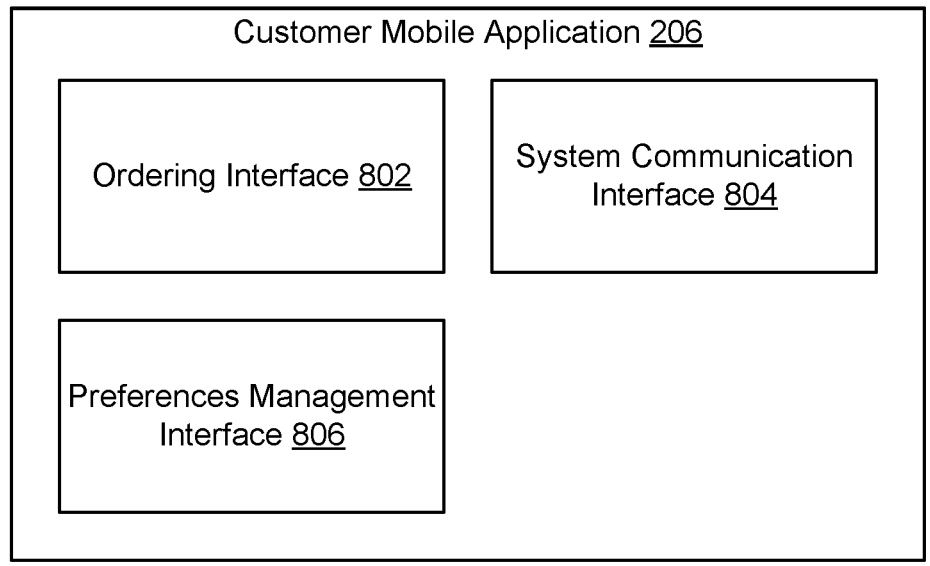
FIG. 8A is a diagram of a customer mobile application (CMA), according to one or more embodiments.

FIG. 8A is a diagram of the customer mobile application (CMA) 206, according to one or more embodiments. The CMA 206 includes an ordering interface 802, which provides an interactive interface with which the user 204 can browse through and select products and place an order. The CMA 206 also includes a system communication interface 804 which, among other functions, receives inventory information from the online shopping concierge system 102 and transmits order information to the system 102. The CMA 206 also includes a preferences management interface 806 which allows the user 204 to manage basic information associated with his/her account, such as his/her home address and payment instruments. The preferences management interface 806 may also allow the user to manage other details such as his/her favorite or preferred warehouses 210, preferred delivery times, special instructions for delivery, and so on.

Shopper Mobile Application

Figure 8B:
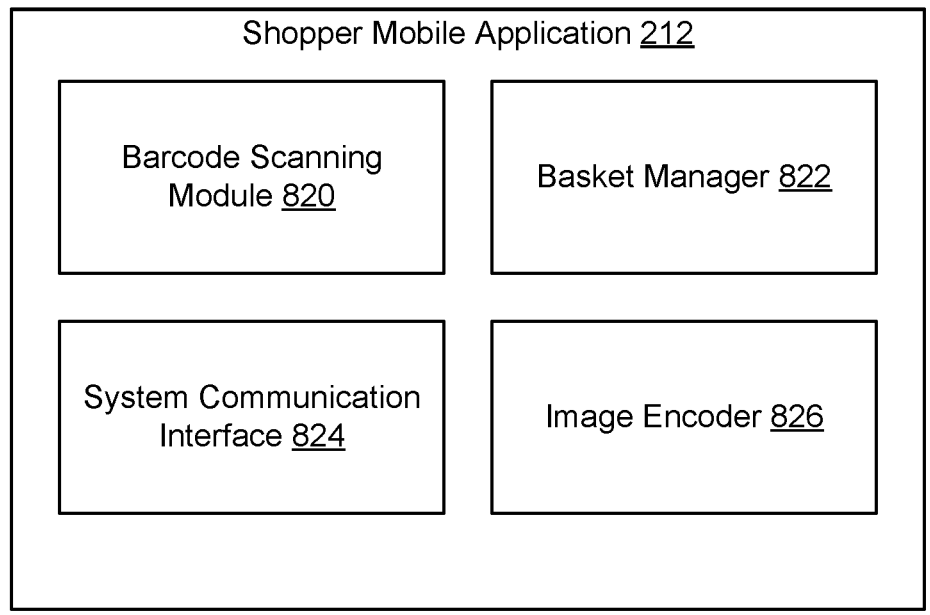
FIG. 8B is a diagram of a shopper mobile application (SMA), according to one or more embodiments.

FIG. 8B is a diagram of the shopper mobile application (SMA) 212, according to one or more embodiments. The SMA 212 includes a barcode scanning module 820 which allows a shopper 208 to scan an item at a warehouse 210 (such as a can of soup on the shelf at a grocery store). The barcode scanning module 820 may also include an interface which allows the shopper 208 to manually enter information describing an item (such as its serial number, SKU, quantity and/or weight) if a barcode is not available to be scanned. SMA 212 also includes a basket manager 822 which maintains a running record of items collected by the shopper 208 for purchase at a warehouse 210. This running record of items is commonly known as a "basket." In one embodiment, the barcode scanning module 820 transmits information describing each item (such as its cost, quantity, weight, etc.) to the basket manager 822, which updates its basket accordingly. The SMA 212 also includes a system communication interface 824 which interacts with the online shopping concierge system 102. For example, the system communication interface 824 receives an order from the online concierge system 102 and transmits the contents of a basket of items to the online concierge system 102. The SMA 212 also includes an image encoder 826 which encodes the contents of a basket into an image. For example, the image encoder 826 may encode a basket of goods (with an identification of each item) into a QR code which can then be scanned by an employee of the warehouse 210 at check-out.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
obtaining marketplace state data associated with an online concierge system that facilitates processing of a request, from a customer via a customer application, for procurement of one or more items from one or more warehouses, assignment of the request to an available shopper via a shopper application, and generation of routing instructions for delivery of the one or more items by the available shopper to the customer;
applying a hyperparameter learning model to the marketplace state data to predict a set of hyperparameters affecting a set of respective parameterized control decision models, wherein the hyperparameter learning model is trained on historical marketplace state data and a configured outcome objective for the online concierge system, wherein training the hyperparameter learning model comprises:
logging the marketplace state data over a period of time; and
re-training the hyperparameter learning model based on the logged marketplace state data;
independently applying the set of parameterized control decision models to the marketplace state data using the hyperparameters to generate a respective set of control parameters affecting marketplace operation of the online concierge system, comprising:
for each of the set of parameterized control decision models,
modifying parameters of the parameterized control decision model using the hyperparameters,
providing the marketplace state data as input to the modified parameterized control decision, and
receiving one of the set of control parameters as output from the modified parameterized control decision; and
applying the respective set of control parameters to modify an operation of the online concierge system.

2. The method of claim 1, wherein training the hyperparameter learning model comprises:
applying an offline reinforcement learning algorithm.

3. The method of claim 1, wherein re-training the hyperparameter learning model comprises:
obtaining, from the marketplace state data, a set of marketplace inputs associated with the period of time;
obtaining, from the marketplace state data, a set of marketplace outcomes associated with the period of time;
deriving an outcome objective value from the set of marketplace outcomes;
applying an optimizer to determine a set of optimal hyperparameters that optimize an outcome objective under the set of marketplace inputs; and
training the hyperparameter learning model to learn relationships between the marketplace state data for the period of time and the set of optimal hyperparameters for the marketplace state data.

4. The method of claim 3, wherein deriving the outcome objective value comprises:
computing a real-time outcome objective associated with the set of marketplace outcomes.

5. The method of claim 3, wherein deriving the outcome objective value comprises:
simulating operation of a marketplace to compute a delayed outcome objective associated with the set of marketplace outcomes.

6. The method of claim 3, wherein applying the optimizer comprises:
  computing respective outcome objective values over varying combinations of hyperparameters; and
  identifying the set of optimal hyperparameters based on an optimal outcome objective value of the respective outcome objective values.

7. The method of claim 1, wherein the control parameters include at least one of:
  an estimated-time-of-arrival (ETA) associated with a proposed delivery request for a customer of the online concierge system;
  a surge pricing level for setting a surge fee associated with a proposed delivery request using the online concierge system;
  a shopper promotion level for setting a shopper promotion amount to encourage additional shoppers to become available for requests in the online concierge system; and
  a batching decision parameter for assigning multiple requests from different customers to a single shopper in the online concierge system.

8. The method of claim 1, wherein applying the set of parameterized control decision models comprises:
  applying for each of the control parameters, a machine learning model trained to learn relationships between a corresponding control parameter and a local objective associated with the corresponding control parameter under the set of hyperparameters.

9. A computer program product comprising a non-transitory computer readable storage medium having instructions encoded thereon that, when executed by a processor, cause the processor to perform steps including:
  obtaining marketplace state data associated with an online concierge system that facilitates processing of a request, from a customer via a customer application, for procurement of one or more items from one or more warehouses, assignment of the request to an available shopper via a shopper application, and generation of routing instructions for delivery of the one or more items by the available shopper to the customer;
  applying a hyperparameter learning model to the marketplace state data to predict a set of hyperparameters affecting a set of respective parameterized control decision models, wherein the hyperparameter learning model is trained on historical marketplace state data and a configured outcome objective for the online concierge system, wherein training the hyperparameter learning model comprises:
    logging the marketplace state data over a period of time; and
    re-training the hyperparameter learning model based on the logged marketplace state data;
  independently applying the set of parameterized control decision models to the marketplace state data using the hyperparameters to generate a respective set of control parameters affecting marketplace operation of the online concierge system, comprising:
    for each of the set of parameterized control decision models,
      modifying parameters of the parameterized control decision model using the hyperparameters,
      providing the marketplace state data as input to the modified parameterized control decision, and
      receiving one of the set of control parameters as output from the modified parameterized control decision; and
  applying the respective set of control parameters to modify an operation of the online concierge system.

10. The computer program product of claim 9, wherein training the hyperparameter learning model comprises:
  applying an offline reinforcement learning algorithm.

11. The computer program product of claim 9, wherein re-training the hyperparameter learning model comprises:
  obtaining, from the marketplace state data, a set of marketplace inputs associated with the period of time;
  obtaining, from the marketplace state data, a set of marketplace outcomes associated with the period of time;
  deriving an outcome objective value from the set of marketplace outcomes;
  applying an optimizer to determine a set of optimal hyperparameters that optimize the outcome objective under the set of marketplace inputs; and
  training the hyperparameter learning model to learn relationships between the marketplace state data for the period of time and the set of optimal hyperparameters for the marketplace state data.

12. The computer program product of claim 11, wherein deriving the outcome objective comprises:
  computing a real-time outcome objective associated with the set of marketplace outcomes.

13. The computer program product of claim 11, wherein deriving the outcome objective comprises:
  simulating operation of the marketplace to compute a delayed outcome objective associated with the set of marketplace outcomes.

14. The computer program product of claim 11, wherein applying the optimizer comprises:
  computing respective outcome objective values over varying combinations of hyperparameters; and
  identifying the set of optimal hyperparameters based on an optimal outcome objective value of the respective outcome objective values.

15. The computer program product of claim 9, wherein the control parameters include at least one of:
  an estimated-time-of-arrival (ETA) associated with a proposed delivery request for a customer of the online concierge system;
  a surge pricing level for setting a surge fee associated with a proposed delivery request using the online concierge system;
  a shopper promotion level for setting a shopper promotion amount to encourage additional shoppers to become available for requests in the online concierge system; and
  a batching decision parameter for assigning multiple requests from different customers to a single shopper in the online concierge system.

16. The computer program product of claim 9, wherein applying the set of parameterized control decision models comprises:
  applying for each of the control parameters, a machine learning model trained to learn relationships between a corresponding control parameter and a local objective associated with the corresponding control parameter under the set of hyperparameters.

17. A computer system comprising:
  a processor; and
  a non-transitory computer readable storage medium having instructions encoded thereon that, when executed by the processor, cause the processor to perform steps including:

obtaining marketplace state data associated with an online concierge system that facilitates processing of a request, from a customer via a customer application, for procurement of one or more items from one or more warehouses, assignment of the request to an available shopper via a shopper application, and generation of routing instructions for delivery of the one or more items by the available shopper to the customer;

applying a hyperparameter learning model to the marketplace state data to predict a set of hyperparameters affecting a set of respective parameterized control decision models, wherein the hyperparameter learning model is trained on historical marketplace state data and a configured outcome objective for the online concierge system, wherein training the hyperparameter learning model comprises:

logging the marketplace state data over a period of time; and re-training the hyperparameter learning model based on the logged marketplace state data;

independently applying the set of parameterized control decision models to the marketplace state data using the hyperparameters to generate a respective set of control parameters affecting marketplace operation of the online concierge system, comprising:

for each of the set of parameterized control decision models. modifying parameters of the parameterized control decision model using the hyperparameters, providing the marketplace state data as input to the modified parameterized control decision, and receiving one of the set of control parameters as output from the modified parameterized control decision; and applying the respective set of control parameters to modify an operation of the online concierge system.

\* \* \* \* \*